United States Patent [19]

Fisher et al.

[11] Patent Number: 4,551,795
[45] Date of Patent: Nov. 5, 1985

[54] APPARATUS FOR USE IN MONITORING A PLURALITY OF VARIABLE PARAMETERS

[75] Inventors: John H. Fisher, Royston; Frank Ferdinandi, Linton, both of England

[73] Assignee: Precision Grinding Limited, Mitcham Junction, England

[21] Appl. No.: 468,845

[22] Filed: Feb. 22, 1983

[30] Foreign Application Priority Data

Feb. 24, 1982 [GB] United Kingdom ............ 8205480

[51] Int. Cl.[4] .................. G05B 9/02; G06F 15/46; G01C 25/00
[52] U.S. Cl. ............................ 364/139; 364/571; 364/474
[58] Field of Search ............ 364/138, 139, 571, 550, 364/565, 578, 579, 580, 474

[56] References Cited

U.S. PATENT DOCUMENTS

| | | | |
|---|---|---|---|
| 4,082,942 | 4/1978 | Tada et al. | 364/139 |
| 4,089,058 | 5/1978 | Murdock | 364/571 |
| 4,114,442 | 9/1978 | Pratt | 364/550 X |
| 4,222,272 | 9/1980 | Mairson | 364/565 X |
| 4,323,976 | 4/1982 | Radaelli et al. | 364/565 |
| 4,356,447 | 10/1982 | Hönig et al. | 364/565 X |
| 4,377,851 | 3/1983 | McNamara | 364/558 X |
| 4,396,974 | 8/1983 | Imazeki et al. | 364/474 X |
| 4,418,392 | 11/1983 | Hata | 364/571 |
| 4,446,715 | 5/1984 | Bailey | 364/571 X |
| 4,464,725 | 8/1984 | Briefer | 364/571 |

Primary Examiner—Joseph Ruggiero
Assistant Examiner—Jon D. Grossman
Attorney, Agent, or Firm—Laff, Whitesel, Conte & Saret

[57] ABSTRACT

Apparatus for use in monitoring a plurality of variables includes a respective transducer arranged to detect a variation in a parameter and to provide an electrical output signal representative thereof and means to couple a signal associated with the output of a transducer to a display either under the control of a manually operated switching arrangement or an automatic scanning arrangement which identifies a detected variation and causes it to be displayed.

3 Claims, 3 Drawing Figures

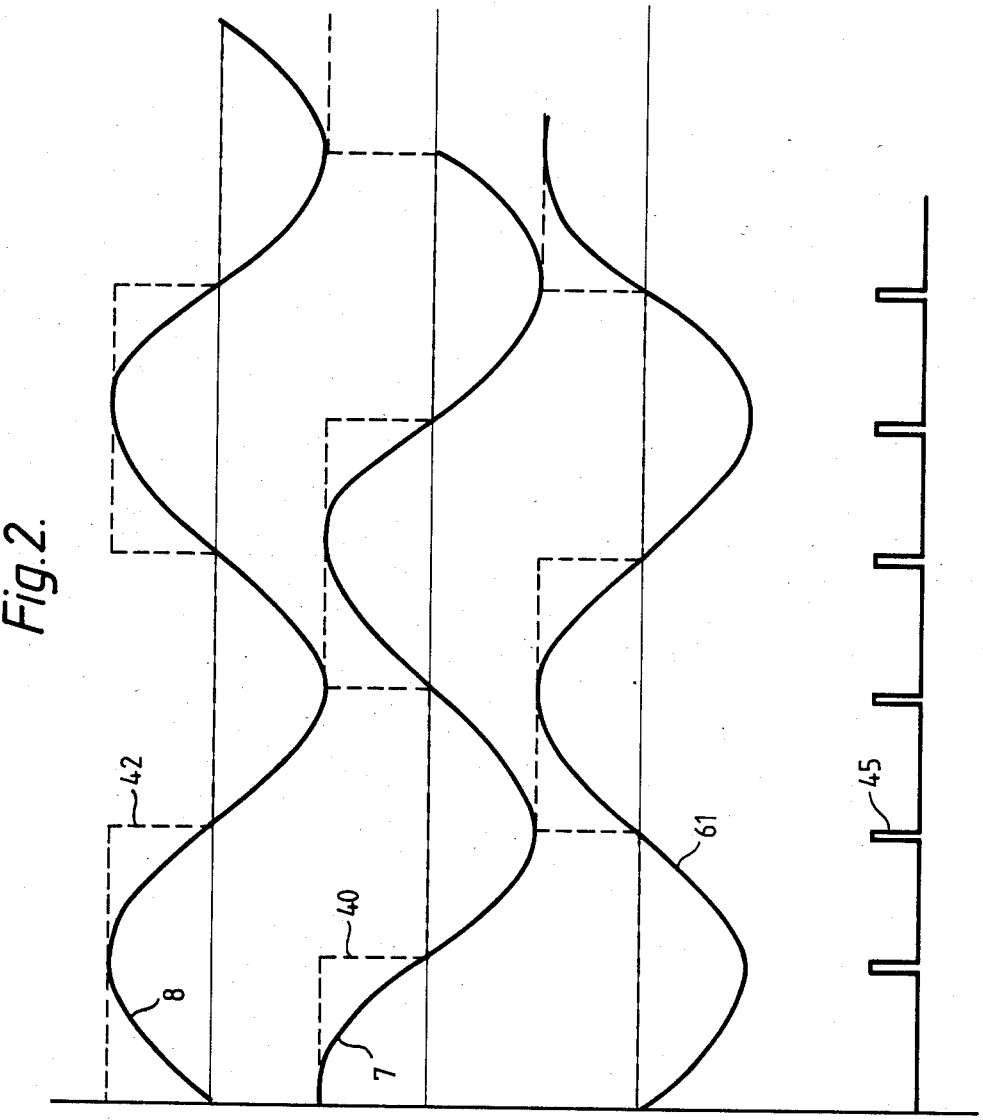

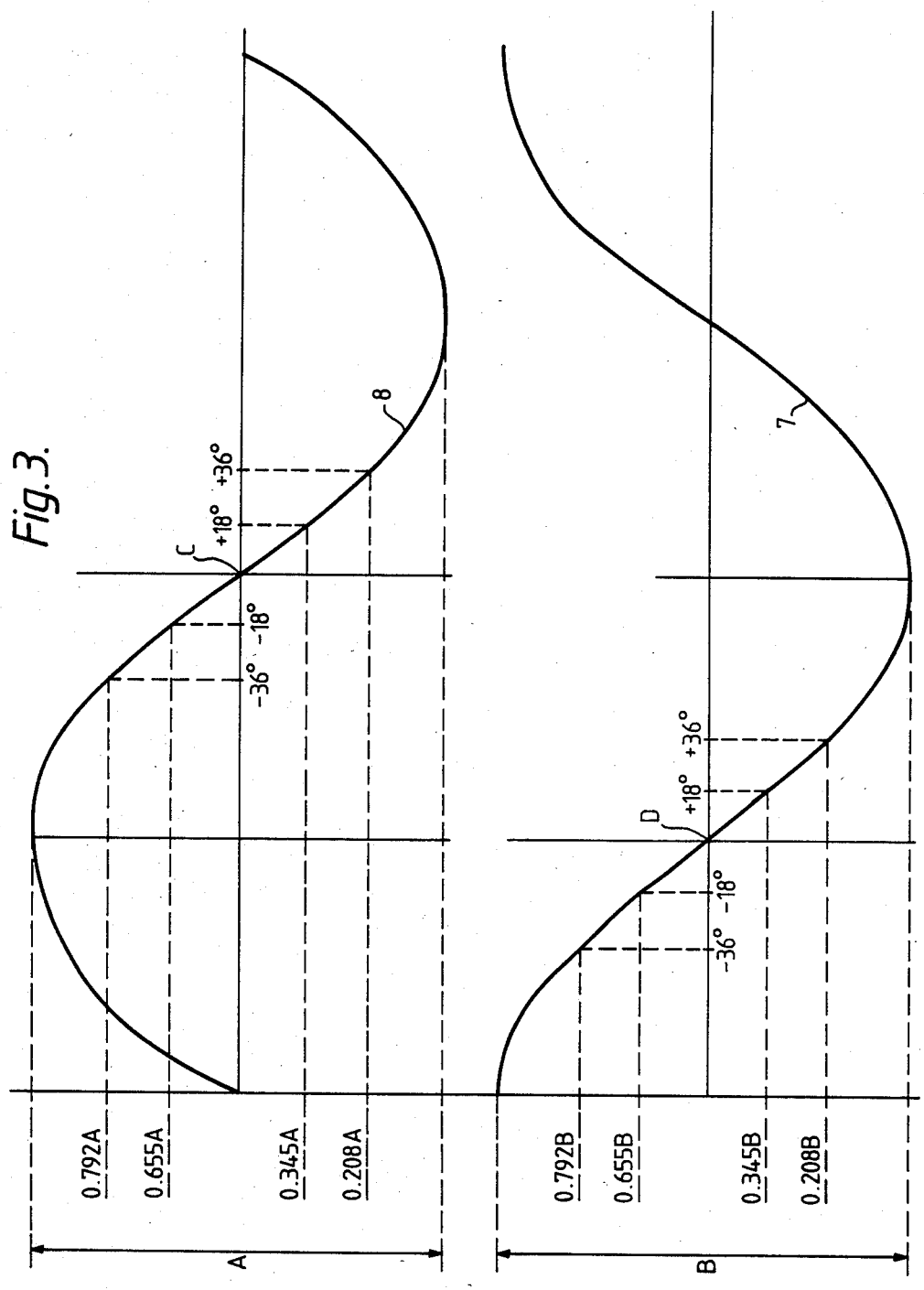

APPARATUS FOR USE IN MONITORING A PLURALITY OF VARIABLE PARAMETERS

This invention relates to apparatus for use in monitoring a plurality of variable parameters, and it has particular, though not exclusive, application to a machine for use in dressing or trimming grinding wheels.

A machine for wheel drressing to which the present invention may be applied is described in the specification of our UK Pat. No. 844,143, the disclosure of which is incorporated herein by reference.

The wheel dressing machine described in the patent specification has a tool which can be positioned accurately in order to form a required profile on the edge and/or side of a rotating grinding wheel. In order to position and move the tool accurately over the required profile, a holder for the tool is mounted upon a radius-setting sub-slide which is carried upon a longitudinally movable tangent slide, the tangent slide, in turn, being mounted upon a radius arm which is rotatable about an angle setting axis, the angle setting axis passing through a member which is itself mounted upon a cross slide and the cross slide being movable upon a depth control slide.

Each of the longitudinal movements of the radius-setting sub-slide, the cross slide and the depth control slide, as well as the rotary movement of the radius arm is carried out using a respective measuring scale, for example a Vernier measuring scale arrangement. The provision of a plurality of separate measuring scales, each arranged at a different position on the machine described in the above mentioned patent specification makes it necessary for an operator to direct his attention to a number of different parts of the machine in order to read the different scales.

One feature of the present invention is the provision of means whereby a plurality of measurements, each taken at a different location, can be read more easily than hitherto.

Embodiments of the invention will now be described, by way of example, with reference to the accompanying drawings, in which:

FIGS. 2 and 3 illustrate electrical waveforms occurring at various points in the circuit of FIG. 1.

Figure 1:
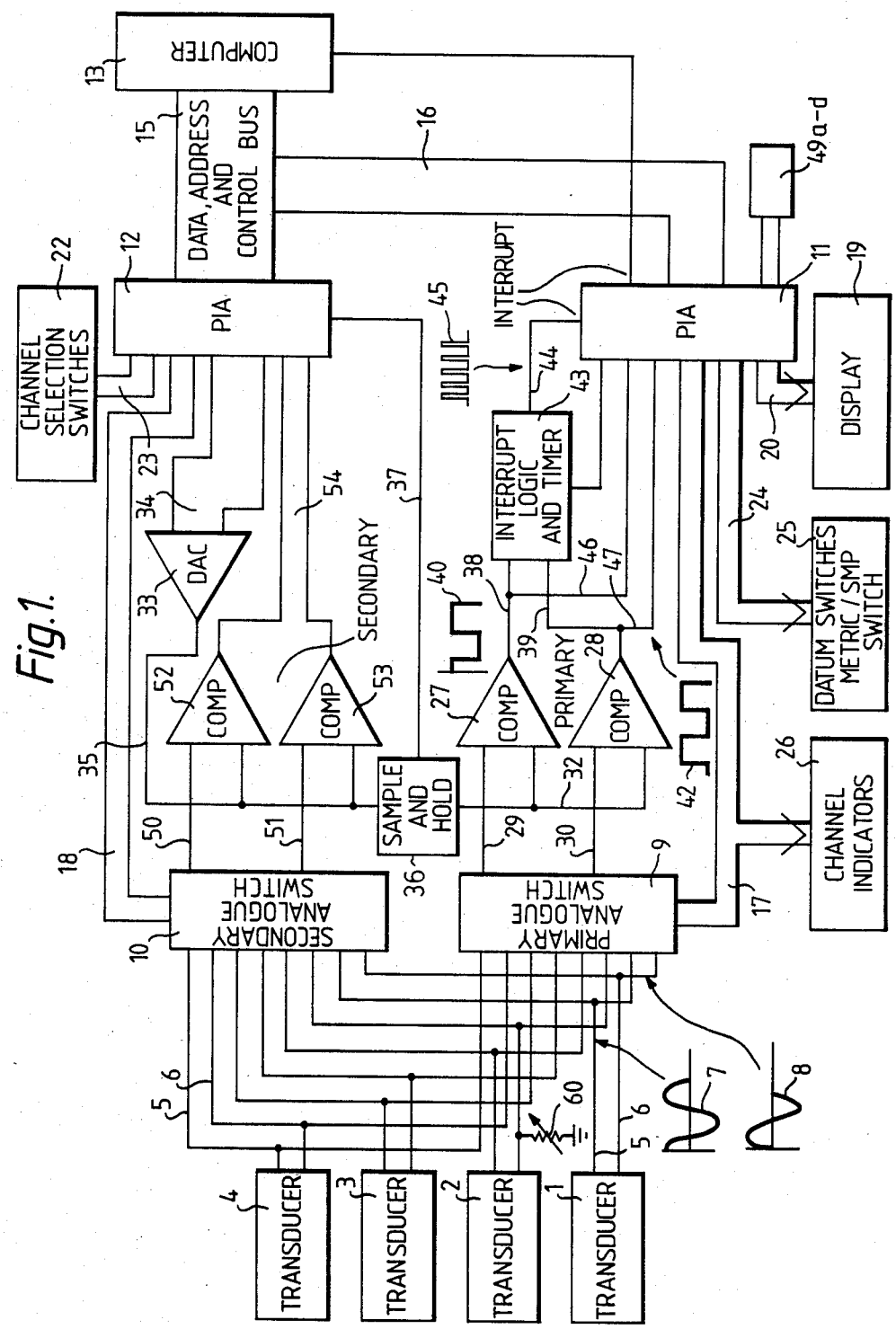
FIG. 1 is a block schematic electric circuit diagram.

In FIG. 1, there is shown a basic block schematic diagram of an electric circuit which, in accordance with usual practice, does not show features of wiring detail, such as power supply and clock signal lines, but whose operation will be clear to those skilled in the art from the following descriptionl.

Referring to FIG. 1, there are shown four transducers 1-4, each transducer having two electrical outputs 5 and 6, which are in phase quadrature, as indicated at 7 and 8. Each output 5 and 6 is coupled to both a primary analogue switch 9 and a secondary analogue switch 10.

The transducers 1-3 detect linear movement and each transducer includes a pair of gratings. Each grating of the pair is carried on one of a pair of parts which are movable linearly relative to one another. Electromagnetic radiations passed from one of the gratings to the other are used to produce an interference fringe pattern. Each transducer includes a detector arranged to detect changes in the fringe pattern and produce the two phase-quadrature electrical outputs, as indicated at 7 and 8, in respect of a respective fringe pattern signal.

By employing two signal outputs in phase quadrature in respect of each fringe pattern signal, it is possible for the subsequent circuitry to divide a complete cycle of each fringe pattern signal into four quadrants comparatively easily. A measurement of displacement between a pair of relatively movable parts is achieved by counting the number of quadrants through which the fringe pattern signal moves and then multiplying the count by the known distance to which one quadrant corresponds. The relative direction of movement of the two movable parts is determined by comparing the relative phases of the two output signals 7 and 8.

The use of gratings in measuring apparatus is well known and a history of their use is traced in a review article in the Journal of Physics E: Scientific Instants for March 1972, Volume 5 No. 3, pages 193-198, published by the Institute of Physics, London, England and entitled Gratings in Metrology.

In the particular embodiment shown in FIG. 1, the transducer 4 detects the rotary movement of a member relative to another and when used with wheel dressing apparatus of the type shown in the above numbered patent specification it detects the rotary movement of the radius arm. The transducer 4 includes a a pair of gratings each of which is carried by one of the two members which are rotatable to one another and it provides two phase quadrature electrical outputs, as indicated at 7 and 8, as a result of passing light between the gratings, in a similar manner to transducers 1-3, in order to enable the quadrants of each fringe pattern signal to be established comparatively easily.

The gratings of the transducer 4 are each constituted by a series of radially extending lines arranged to overlap so that the passage of light between them results in the production of moiré fringes.

It will be appreciated that when the transducers 1-3 are used with the wheel dressing machine referred to above, they detect the movement of the respective longitudinally movable slides.

Two peripheral interface adaptors 11 and 12 provide interface connecting lines between a computer 13 and the remainder of the circuit. The computer 13 controls the primary and secondary analogue switches 9 and 10 via the adaptors 11 and 12 and control buses 15, 16, 17 and 18. A five digit, seven segment LED display 19, which is used to display an output measurement from a selected one of the transducers 1-4, is supplied with multiplexed signals via a bus 20 from the adaptor 11 under the control of the computer 13. Manually operable channel selection switches 22 are coupled via a bus 23, the adaptor 12 and the bus 15 to the computer 13, and their operation may be used to determine which transducer output is displayed at 19. Also coupled to the adaptor 11 via a bus 24 are switches indicated at 25 which may be actuated to cause the computer 13 to set the display at 19 in respect of a particular selected transducer 1-4 to a datum, for example to zero in respect of the rotary channel corresponding to transducer 4. Other switches indicated by the block 25 may be set to cause the display at 19 to be in a particular system of units, for example, in the case of linear measurement in either metric or imperial units. Channel indicators, in the form of a series of lightemitting diodes, are represented by a block 26. In the particular apparatus being described, each of the channel indicators represented by the block 26 is arranged on a panel in association with a respective one of the channel selection switches indicated by the block 22, so that the selected channel is clearly indicated to the operator.

One of the sets of outputs from the transducers 1–4 on the lines 5 and 6, which has been selected for display, either by the operation of a channel selection switch indicated at 22, or by an automatic selection process to be described below, is coupled by the primary analogue switch 9 to respective comparators 27 and 28 on lines 29 and 30. Also coupled to the comparators 27 and 28 on a line 32 is a reference level signal. The reference level signal is obtained via a digital to analogue converter 33, under the control of the computer 13 via the bus 15, the adaptor 12 and a bus 34. The reference level signal obtained from the output of the digital to analogue converter 33 on a line 35 is passed via a sample and hold circuit 36 to the line 32 under the control of the computer 13 which is exercised via a line 37, the adaptor 12 and the bus 15. The sample and hold circuit 36 maintains a reference level on the line 32 at a predetermined value during the periods when the digital to analogue converter 33 is being used for analogue signal measurements.

The reference level on the line 32 is set at such a value that the comparators 27 and 28 produce square wave output signals on line 38 and 39, as indicated at 40 and 42. It will be understood that, since the output signals 7 and 8 on lines 5 and 6 are 90° out of phase, the square wave output signals 40 and 42 are similarly in phase quadrature. These out-of-phase signals 40 and 42 on the lines 38 and 39 are applied to a logic circuit 43 which gates the signals in such a way that an output is provided on a line 44 in the form of a signal 45 which consists of a series of pulses, each pulse corresponding to the beginning of one of the quadrants of each cycle of one of the signals 7 or 8. It will be appreciated that each pulse of the pulse train 45 corresponds to a particular portion of the original fringe pattern. The pulse signals 45 on the line 44, which are referred to as interrupt pulses, are fed to the adaptor 11, to which the signals 40 and 42 are also fed on lines 46 and 47, the information on the lines 44, 46 and 47 is fed via the adaptor 11 and the buses 16 and 15 to the computer 13 which examines the signals on the lines 46 and 47 each time that an interrupt pulse 45 occurs and, according to the quadrant in which the interrupt pulse occurs, the computer either increments or decrements an associated respective one of counters 49a–d for the channel corresponding to the transducer 1–4 whose output is being read. The contents of the particular counter are fed via 11 and 20 and displayed continuously at 19. From the output of the secondary analogue switch 10 there are coupled on lines 50 and 51 outputs to a second pair of comparators 52 and 53 to whose inputs the level signal from the digital to analogue converter 33 is applied on the line 35. The outputs from the comparators 52 and 53 are applied on a bus 54 to the adaptor 12. The computer 13 provides repetitive switching instructions via the bus 15, the adaptor 12 and the bus 18 to the secondary analogue switch 10 to cause the secondary analogue switch to scan continuously the outputs 5 and 6 from each of the transducers 1–4. The computer is thus continuously monitoring the outputs of each of the comparators 52 and 53, which will correspond to the outputs of the comparators 27 and 28 and, should the computer 13 detect a change in an output on a particular channel whose output is not being displayed at a particular instant, it will ensure that the respective counter is incremented or decremented accordingly. Should the output of either of the comparators 52 or 53 change by more than two quadrants of a cycle of the output signal from the transducer then the primary analogue switch is switched to cause the output of the channel from that particular transducer to be displayed at 19 and indicated at 26. The operator will thus be alerted to the fact that a particular transducer output is changing. It is preferred not to cause the automatic changeover of the primary analogue switch 9 to take place when less than two quadrants of a cycle change takes place in order to avoid the occurrence of unnecessary switching as a result of noise or other interference.

The arrangement is designed to operate automatically. However should it be necessary, for example during the setting-up procedure to select manually the channel to be displayed, the computer 13 is enabled to take account of the manual control instructions if the moving parts of the transducers are moved below a predetermined speed. The frequency of the interrupt pulses 45 is monitored by the computer and if their period exceeds that of a monostable device, which in the particular embodiment corresponds to a frequency of the interrupt pulses of 10 Hz, the computer 13 scans the channel selection switches 22 and the datum switches 25 and obeys the instructions of these switches to display a particular channel or set a display to a particular datum.

In order to increase the resolution of the measurement, when the rotary channel transducer 4 is used, each 90° segment of the output signals 7 and 8 from the transducer 4 is divided, in effect, into five segments of 18° each. At the computer 13, scaled sine look-up tables are stored and information from these tables is fed to the comparators 52 and 53 as analogue signals via the bus 15, the adaptor 12, the bus 34 and the digital to analogue converter 33. At the same time the computer 13 counts from the interrupt signals 45 the particular 18° segment in which the comparison between the output from the secondary analogue switch 10 and the signal on the line 35 is being made by the comparators 52 and 53. The outputs from the comparators 52 and 53 are monitored by the computer 13 via the bus 54, the adaptor 12, and the bus 15 and it is determined whether the transducer signal on the lines 50 and 51 is above or below the signal from the digital to analogue converter on the line 35. The values in the sine look-up table are successively fed to the line 35 until the correct 18° value is found. The display information fed to the display 19 from the computer 13 is thus obtained from a combination of techniques which includes counting the particular 18° segment in which the measurement is taking place and then determining from the comparison step the particular angular value of the segment.

When the apparatus is first switched on, a special calibration routine is brought into operation.

The calibration routine enables the value of a respective load resistor, one of which is indicated at 60, connected to each output 5 and 6 of a transducer 1–4 to be adjusted. In the calibration mode the transducer, whose load resistors are to be adjusted, is selected by means of a selection switch (not shown). Movement of the selected transducer causes the computer 13 to measure repeatedly, via the digital to analogue converter 33 and the secondary comparators 52, 53, the amplitude of one of the two signals from that transducer.

The signal is measured over several cycles and, from the maximum and minimum values, the computer establishes an average signal level. The difference between this average level and the mid-point of the range of the digital to analogue converter 33 is displayed at 19. In one particular embodiment, the mid-point of the digital to analogue converter range is 1.25 volts, and the transducer output channel is calibrated by adjusting the appropriate load resistor 60 manually until the displayed reading is zero. A manually operable switch is used to switch between the outputs of each transducer, in turn, in order to enable all of the outputs to be calibrated.

The invention employs two distinct techniques in making the measurements.

Firstly, a digital counting technique is used in making the measurements for all of the axes. Interrupt signals 45 which are directly related to the outputs of the transducers 1-4 and thus to the movement of the moiré fringe patterns, are produced in each case.

FIG. 2 shows the relationship between the cos wave 7 and sine wave 8 which are produced at the outputs of the transducers when there is relative movement between them in one direction. At 61 in FIG. 2 there is shown the output waveform resulting from relative movement in the opposite direction. The phase reversal is used to detect a change in the direction of movement. In FIG. 2, there are shown in dotted outline the signals 42 and 40 appearing at the outputs of the comparators 28 and 27 based on the sine wave 8 and cos wave 7 respectively. The interrupt pulses 45 are generated in the interrupt logic 43 from the front and rear edges of the signals 42 and 40.

The counting is effected by means of software counters, which are in fact constituted by locations in the RAM of the computer 13 and which are incremented or decremented, according to the direction of movement determined by the phase relationship of the signals from the transducer, whenever there is an interrupt pulse 45. When measuring on a linear axis, the relative movement between the parts of the transducer which corresponds to the interval between a pair of interrupt signals is 5 µm. When making a rotary measurement, the interval between interrupt signals 45 corresponds to a movement through 5 minutes of arc.

The second technique which is used in the measuring operation, is employed in relation to the rotary measurement and uses the interpolation technique.

The interpolation technique will now be described in more detail with reference to FIG. 3, which shows at 7 and 8 the output signals from the transducer 4. It will be noted that the peak to peak value of the sine wave 8 is A and that of the cosine wave 7 is B. The interpolation is carried out with respect to the linear portions of the waveforms about the points C and D respectively. It will be noted that the amplitudes of the waveforms 8 and 7 at 36° and 18° after and 18° and 36° before the points C and D are respectively 0.208, 0.345, 0.0655 and 0.792 of the peak to peak values B and A. These amplitude values are well spaced and, since they occur on the relatively linear parts of the waveform are easily determined. By switching between the waveforms 7 and 8 it is possible to identify each 18° point in a 90° quadrant on a relatively linear part of waveforms. Since each quadrant occurring between the interrupt signals 45 corresponds to 5 minutes of arc, it is possible, by comparing the signal amplitude to values stored in a sine look-up table in the computer 13 to determine the points corresponding to the five 18° intervals in each quadrant, and thus the position of the transducer to within 1 minute of arc.

The interpolation routine increments a software counter that has a maximum count of four. The count in this software counter is added to the count in the main counter of the interrupt signals 45 before the total count is displayed.

In principle only one of the signals from the rotary transducer 4 need be used for interpolation. However, in order to improve the accuracy of the interpolation, both signals are used. Because the relationship between the two signals is that of a sine and cosine, as one signal approaches its peak, and its rate of change of amplitude is rapidly reducing, the other rate of change of amplitude of the other signal approaches a maximum. Thus, by switching signals halfway through a quadrant the interpolation is always carried out on the signal with the greatest rate of change of amplitude. The switching is achieved by selecting which of the secondary comparator outputs is monitored after a value from the look up table is output to the DAC 33.

With regard to the feature of automatic switching from one axis to another, it will be appreciated from what has been said above that when a channel has been selected, either manually, or automatically, the primary circuits 9, 27, 28 and 43 are switched to that channel and the counting for that channel is controlled by the interrupt signals 45. The other channels are monitored in the main program loop of the computer 13 by means of the secondary analogue switch 10 and the secondary comparators 52 and 53.

The main software counter for each channel is incremented or decremented whenever the pair of signals from the appropriate transducer move from one quadrant to another. Every time that a software counter is incremented or decremented, the new quadrant information is also stored, i.e. the outputs of the two primary comparators 27, 28 are stored. These outputs are compared with the values of the comparators 27, 28 for the previous quadrant to determine the direction of movement.

During the monitoring of the other channels using the secondary circuits 10, 52 and 53, information related to the quadrant in which each of the pair of signals for each channel lies is compared with the respective quadrant information that was stored when the appropriate counter was incremented or decremented. If the present quadrant information is different from respective stored quadrant information, then the appropriate counter is incremented or decremented and the new quadrant information is stored. When the computer detects, by means of the secondary analogue switch 10 and the secondary comparators 52, 53, that the signals on a channel have moved through two quadrants, the primary analogue switch 9 is changed to select the moving channel and the display 19 is switched to show information related to that channel and the threshold value for that channel is set up on the DAC 33. The channel on which movement has been detected becomes the main channel which provides the interrupt pulses 45.

Whenever a channel is selected, either manually or automatically the primary circuits 9, 27, 28 and 43 and the display 19 remain set on that channel until another channel is selected.

A further feature of the arrangement shown in FIG. 1 is the provision of long term drift compensation.

When the unit is switched on, the threshold level on the primary comparators 27 and 28 is set to 1.25 volts, which is the mid-point of the range of the DAC 33. When the transducer 4 for the rotary axis is moved over a few cycles, the maximum and minimum values of both signal outputs are measured. From these values the computer 13 computes a new threshold value for the rotary axis which is the mean level of the four maximum and minimum values measured. When each of the other axes is first selected after power-on, this process is repeated until the outputs of the transducers 1, 2 and 3 associated with each of the other axes have been measured and a mean level for each axis has been computed and stored. Subsequently whenever a transducer associated with a particular axis is selected the appropriate threshold level is set up on the comparators by means of the DAC 33 via the line 35.

We claim:

1. Apparatus for use in monitoring a plurality of variable parameters, said apparatus including a plurality of transducers, means including each transducer for detecting a variation in a respective parameter and for providing two out-of-phase elelctrical output signals representative of said respective parameter, first and second analog switches, means for applying the two out-of-phase signals from each of the transducers to each of the first and second analog switches, a gating circuit, means for coupling the first analog switch to the gating circuit for transmitting signals related to the output of a respective transducer, display means, means for applying signals derived from the output of the gating circuit to the display means in order to display an output which is representative of a parameter being monitored, a computer, adapter means coupled to the computer and to the second analog switch for causing the second analog switch to scan the outputs from each of the transducers and to detect any change in an output from a transducer, storage means for storing a respective signal to be displayed, and means under the control of the computer for causing the contents of the storage means to be changed according to any change in an output from a transducer which is detected by the second analog switch.

2. The apparatus in claim 1 further including means associated with the computer and the second analog switch for detecting a change by a given amount in the output signal of one of the transducers, the first analog switch being switched and the output from said one transducer being displayed by the display means.

3. The apparatus in claim 1 further including an adjustable load resistor connected to the output of a transducer, a digital-to-analog converter, means in the computer for measuring via the digital-to-analog converter the average value of an output signal from the transducer to which the load resistor is connected and for displaying said average value on the display means, and means for varying the value of the load resistor in order to enable the displayed average value to be adjusted to a given value.

* * * * *